United States Patent

Ivanov

(10) Patent No.: US 8,682,738 B2
(45) Date of Patent: Mar. 25, 2014

(54) SYSTEM AND METHOD FOR USING A DIGITAL INVENTORY OF CLOTHING

(75) Inventor: Aleksey V. Ivanov, Atlantic Highlands, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 846 days.

(21) Appl. No.: 12/608,650

(22) Filed: Oct. 29, 2009

(65) Prior Publication Data

US 2011/0107263 A1     May 5, 2011

(51) Int. Cl.
*G06Q 30/00*     (2012.01)

(52) U.S. Cl.
USPC .......................................................... 705/26.1

(58) Field of Classification Search
USPC ............................................ 705/26, 27, 26.1
See application file for complete search history.

(56) References Cited

U.S. PATENT DOCUMENTS

| | | |
|---|---|---|
| 2001/0030754 A1 | 10/2001 | Spina et al. |
| 2003/0101105 A1 | 5/2003 | Vock |
| 2005/0154487 A1 | 7/2005 | Wang |
| 2007/0011173 A1* | 1/2007 | Agostino ........................ 707/10 |
| 2007/0038944 A1* | 2/2007 | Carignano et al. ............ 715/757 |
| 2008/0082395 A1* | 4/2008 | Shulman et al. ................ 705/10 |
| 2008/0126962 A1 | 5/2008 | Cook |
| 2008/0225123 A1 | 9/2008 | Osann et al. |
| 2009/0158210 A1* | 6/2009 | Cheng et al. ................... 715/810 |

* cited by examiner

*Primary Examiner* — Mila Airapetian
(74) *Attorney, Agent, or Firm* — Guntin & Gust, PLC; Andrew Gust

(57) ABSTRACT

A device includes a communication module and a display. The communication module is configured to communicate with a personal database and to receive a plurality of digital images associated with a respective piece of clothing and/or an outfit from the personal database. The display is coupled to the communication module, and configured to display a first digital image associated with a recommended outfit based on a plurality of daily events associated with a user of the device. The display is also configured to display a second digital image associated with an advertised piece of clothing, and configured to enlarge the first digital image associated with the recommended outfit if the first digital image is selected or to enlarge the second digital image associated with the advertised piece of clothing if the second digital image is selected.

20 Claims, 5 Drawing Sheets

SYSTEM AND METHOD FOR USING A DIGITAL INVENTORY OF CLOTHING

FIELD OF THE DISCLOSURE

The present disclosure generally relates to communications networks, and more particularly relates to a system and a method for using a digital inventory of clothing.

BACKGROUND

An individual can have different types of clothes for different occasions, such as business events, everyday events, exercising, and the like. Depending on the size of the closet that the individual has to store the clothes, the individual may have trouble finding all of the different pieces of clothing when deciding on something to wear. As a result, the individual may take a long time deciding what to wear, or might not notice a piece of clothing that the individual would have liked to wear.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
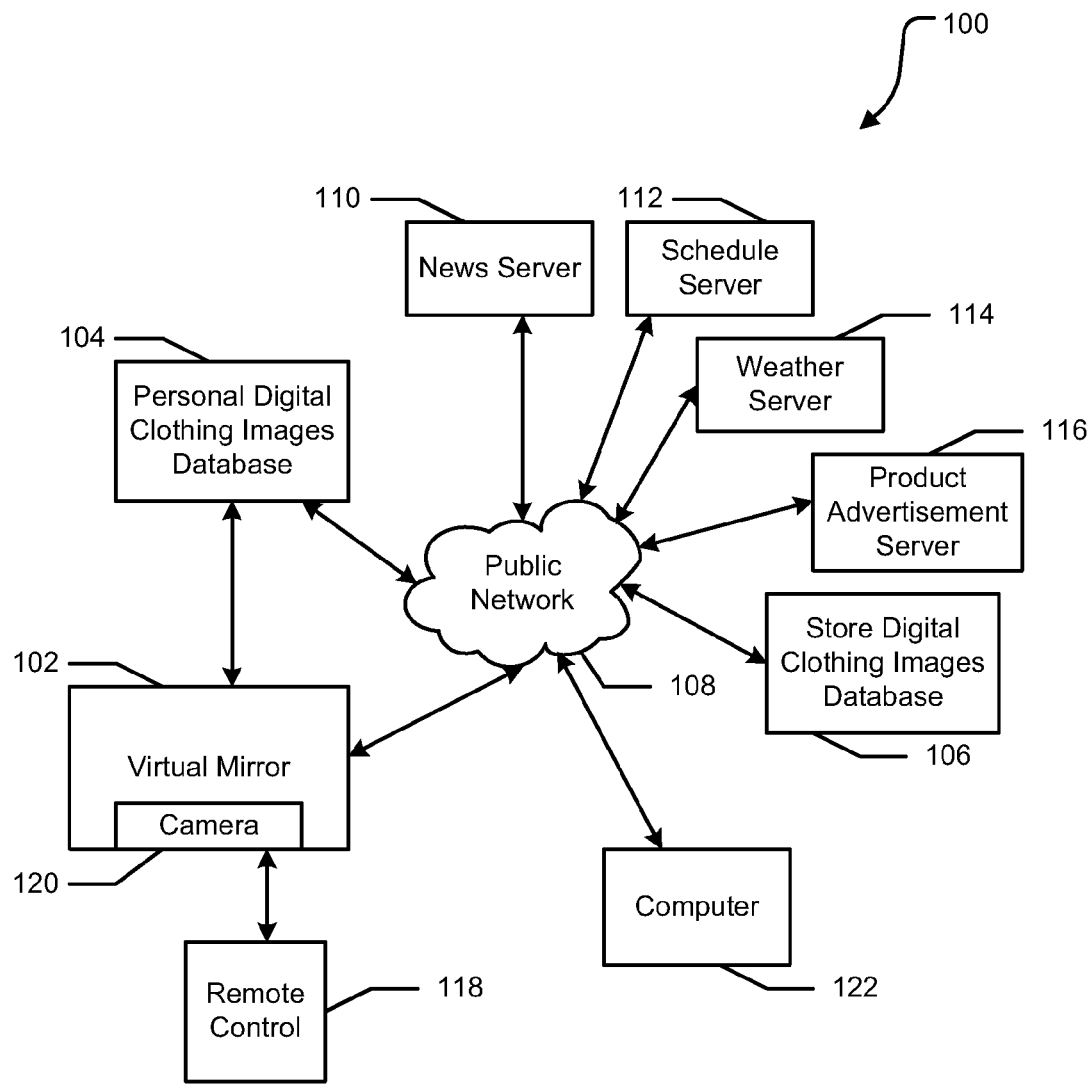
FIG. 1 is a block diagram of a digital clothing system.

FIG. 1 shows a digital clothing system 100 including a virtual mirror 102, a personal database 104, a store database 106, and a public network 108. The digital clothing system 100 also includes a news server 110, a schedule server 112, a weather server 114, a product advertisement server 116, and a remote control 118. The virtual mirror 102 can utilize the public network 108 to communicate with the personal database 104, the store database 106, the news server 110, the schedule server 112, the weather server 114, and the product advertisement server 116. The virtual mirror 102 is in communication with the remote control 118 preferably via infrared signals. In an embodiment, the personal database 104 may be part of the virtual mirror 102 or the personal database may be located on the same premises as the virtual mirror such that the virtual mirror can communicate with the personal database via a local area network instead of the public network. The virtual mirror 102 can be a television, a computer with a monitor, a personal digital assistant, a cellular telephone, or any other device having a camera and a display.

A user can utilize the remote control 118 to control the virtual mirror 102 and to display digital images of clothing on a virtual body of the user. Thus, the user can utilize the virtual mirror 102 to put together an outfit and to determine how the outfit may look on the user. The virtual mirror 102 can receive the digital images from the personal database 104 and/or from the store database 106. Additionally, the digital images of the clothing can be created by the virtual mirror 102 via one or more cameras 120 on the virtual mirror. For example, if the user has a piece of clothing that the user wants to have stored as a digital image in the personal database 104, the user can select an input/record key on the remote control 118 to activate the cameras 120. When the virtual mirror 102 is ready to record the piece of clothing, the user can either hold the piece of clothing or can stand wearing the piece of clothing at a particular location in front of the virtual mirror. The user can then rotate the piece of clothing at the particular location in front of the virtual mirror 102 so that the cameras 120 can record a video of the piece of clothing. The virtual mirror 102 can then use the video from the camera 120 to create a digital image of the piece of clothing, which can include a three hundred and sixty degree view of the piece of clothing.

Alternatively, the user can purchase a new piece of clothing that has a radio frequency identification (RFID) tag connected thereto. The virtual mirror 102 can detect the RFID tag and request a digital image associated with the piece of clothing from the store database 106. The virtual mirror 102 can then receive the digital image for the piece of clothing from the store database 106 and store the digital image in the personal database 104 for later use. The virtual mirror 102 can communicate with the news server 110, the schedule server 112, the weather server 114, and the product advertisement server 116 to receive information for use in the virtual mirror to recommend different outfits to the user, as discussed below with respect to FIGS. 2 and 3.

Figure 2:
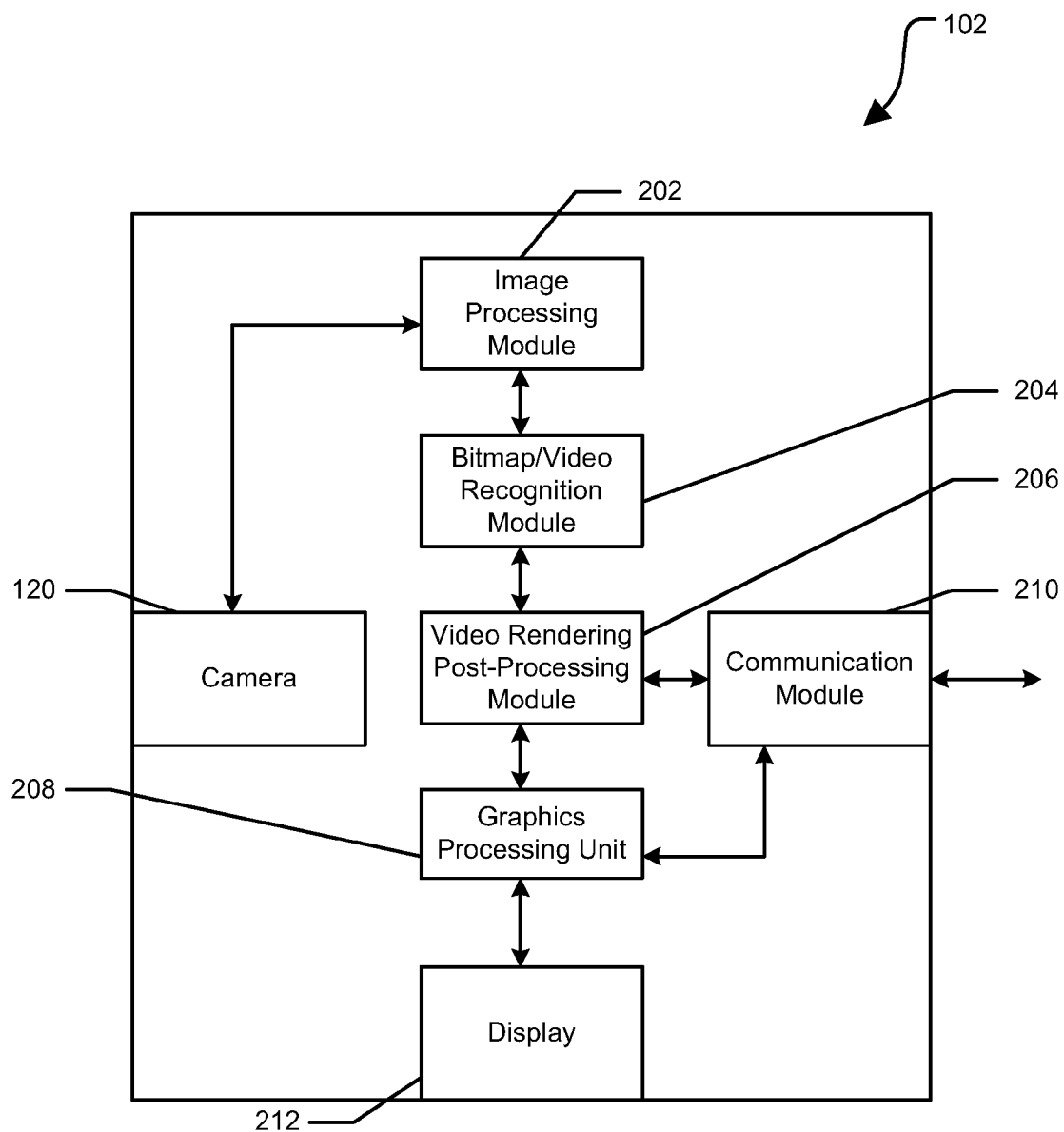
FIG. 2 is a block diagram of components within a virtual mirror of the digital clothing system.

FIG. 2 shows a block diagram of a portion of the virtual mirror 102 including the camera 120, an image processing module 202, a bitmap/video recognition module 204, a video rendering post-processing module 206, a graphical processing unit 208, a communication module 210, and a display 212. The camera 120 is in communication with the image processing module 202, which in turn is in communication with the bitmap/video recognition module 204. The video rendering post-processing module 206 is in communication with the bitmap/video recognition module 204, with the graphical processing unit 208, and with the communication module 210. The graphical processing unit 208 is in communication with the communication module 210 and with the display 212.

When the camera 120 has created the video and/or the digital image of the clothing held in front of the virtual mirror 102 as stated above, the camera can send the video and/or image to the image processing module 202 for processing. The processed video and/or digital image can then be sent to the bitmap/video recognition module 204 so that the processed video and/or digital image can be analyzed and an outline of the piece of clothing can be identified. The video rendering post-processing module 206 can then create an individual digital image for the piece of clothing. The digital image can be sent to the graphical processing unit 208 and to the communication module 210. The graphical processing unit 208 can output the digital image to the display 212, so that the user can view the digital image of the piece of clothing. The communication module 210 can send the digital image to the personal database 104 for storage.

The communication module 208 can also receive digital images for clothing from the store database 106, can store the digital images in the personal database 104, and/or can send the digital images received from the store database to the graphical processing unit 208 to be output on the display 212. Additionally, the communication module 210 can provide the virtual mirror 102 with access to the news server 110, the schedule server 112, the weather server 114, and the product advertisement server 116 to receive information associated with an outfit recommendation and/or a clothing advertisement to be displayed on a graphical user interface 300, as shown in FIG. 3.

Figure 3:
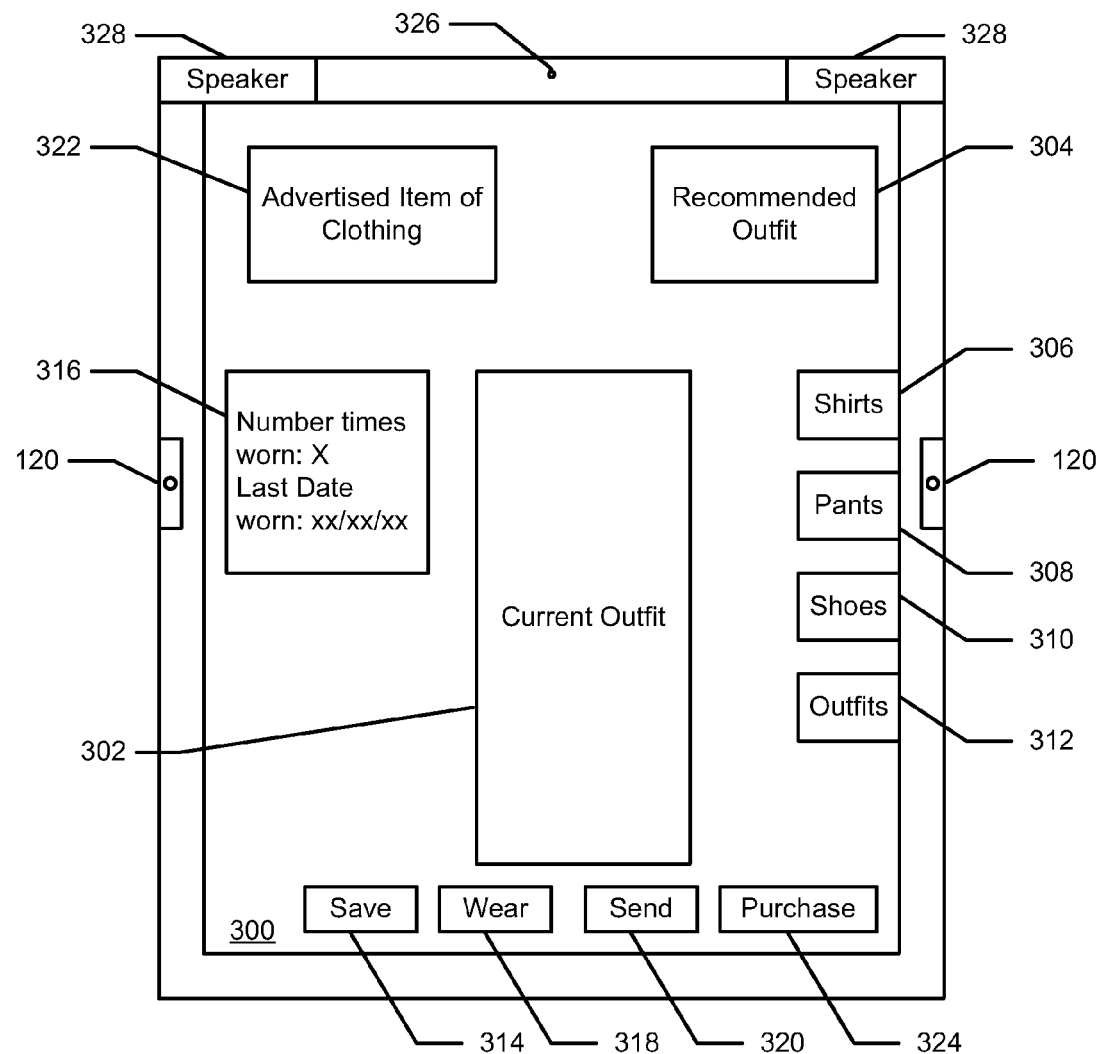
FIG. 3 is an exemplary graphical user interface for a display of the virtual mirror.

FIG. 3 shows the graphical user interface 300 including a current outfit display 302, a recommended outfit display 304, a shirts selection 306, a pants selection 308, a shoes selection 310, an outfit selection 312, a save button 314, a frequency counter 316, and an advertised item of clothing display 322. The virtual mirror 102 includes a microphone 326, speakers 328, and the cameras 120. The user can utilize the remote control 118 and the virtual mirror 102 to virtually assemble different outfits and select an outfit to wear. The user can select the shirts selection 306 to view the different digital images of shirts stored in the personal database 104 that correspond to a shirt in the user's closet or dresser. The user can then select a shirt, which can be displayed in the current outfit display 302. Additionally, the user can select the pants selection 308 to view the pants options and select a pair of pants for the outfit. The user can also select the shoes selection 310 to view different shoe options and select a pair of shoes for the outfit. When the user selects a shirt, a pair of pants, and/or a pair of shoes, the virtual mirror 102 can put each of the items together as one outfit to be displayed in the current outfit display 302 of the graphical user interface 300.

If the user likes the outfit in the current outfit display 302, the user can select the save button 314 so that the outfit can be stored in the personal database 104. When the user has saved the outfit, the user can enter information for the outfit and the information can also be stored in the personal database 104. The information can indicate that the outfit is for warm, cool, hot, or cold weather, and/or that the outfit is business attire, casual attire, workout attire, and the like. The user can browse previously stored outfits by selecting the outfit selection 312. When the user selects an outfit, the outfit can be displayed in the current outfit display 302 and any information entered by the user about the outfit can also be displayed in the current outfit display.

The frequency counter 316 can display the number of times that the user has worn an outfit and can also indicate the date of the last time the outfit was worn. When an outfit is in the current outfit display 302, the frequency counter 316 can display the information associated with the outfit. The user can utilize the information in the frequency counter 316 in deciding whether to wear the outfit in the current outfit display 302. If the user decides to wear the outfit, the user can select the wear button 318. In response to the selection of the wear button 318, both the number of times that the outfit has been worn can be incremented and the date of the last time the outfit was worn can be updated to include the current date in the frequency counter 316.

The user can send an outfit shown in the current outfit display 302 to another user via the communication module 210 and the public network 108. The communication module 210 can set up a communication link with a virtual mirror of another user, and the outfit can be transmitted over the communication link. The communication link can also be utilized for voice communication between the users via the microphone 326 and the speakers 328. Thus, the other virtual mirror can display the received outfit so that the other user can view the outfit. The users can then discuss the outfit using the microphone 326 and the speakers 328, such that the user can get real-time feedback from the other user before actually trying on the outfit.

The communication module 210 of FIG. 2 can connect with the news server 110, the schedule server 112, and the weather server 114 and receive different information for the virtual mirror 102 to use in determining an outfit to recommend to the user. For example, the schedule server 112 can send information indicating that the user has a meeting scheduled in the afternoon, and the weather server 114 can send information indicating that the high temperature for the day will be fifty degrees Fahrenheit. Based on the information received from the schedule server 112 and the weather server 114 the virtual mirror 102 can recommend an outfit that is warm business clothing. The recommended outfit can be displayed on the recommended outfit display 304 of the graphical user interface 300. The user can view the recommended outfit and decide whether to select the recommended outfit. If the recommended outfit is selected, the outfit can be displayed in the current outfit display 302.

The communication module 210 can also receive an advertisement from the product advertisement server 116 and display the advertisement in the advertised item of clothing display 322. The advertisement can include a digital image of a piece of clothing and information corresponding to the advertisement. The information can include that the piece of clothing is on sale, the sale price, the length of the sale, and the store that is offering the piece of clothing. The user can select the advertised piece of clothing and have the piece of clothing displayed with an outfit in the current outfit display 302. The user can then decide how the advertised piece of clothing may look on the user and with pieces of clothing already owned by the user. If the user decides to purchase the advertised piece of clothing, the user can select the purchase button 324. When the purchase button 324 is selected, the virtual mirror 102 can order the piece of clothing and request a digital image of the clothing from the store database 106 via the communication module 210. When the digital image is received for the purchased piece of clothing, the communication module 210 can send the digital image to the personal database 104 for later user.

In an embodiment, the computer 122 can be used to remotely access the virtual mirror 102 and the personal database 104. The computer 122 can connect to the virtual mirror 102 and the personal database 104 via the public network 108. The user can enter a password to remotely access the personal database 104, and can then utilize the computer 122 to create new outfits, enter information about previously saved outfits, download digital images of clothing purchased from the store database 106, store the new digital images in the personal database, and the like.

Figure 4:
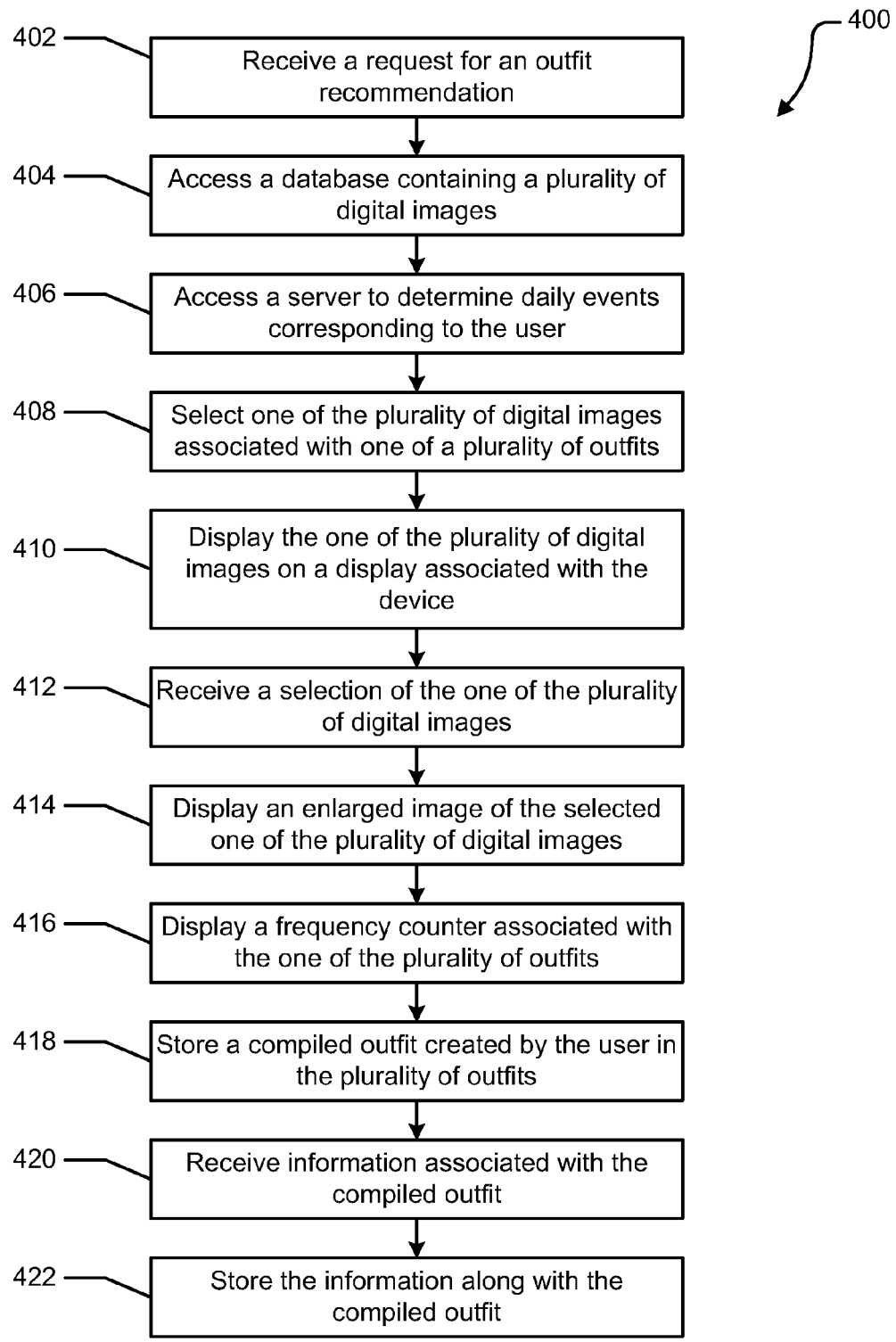
FIG. 4 is a flow diagram of a method for recommending an outfit in the digital clothing system.

FIG. 4 shows a flow diagram of a method 400 for providing a clothing recommendation to a user of the digital clothing system. At block 402, a request for an outfit recommendation is received. A database containing a plurality of digital images is accessed at block 404. Each of the digital images can correspond to a respective piece of clothing and/or an outfit. At block 406, a server is accessed to determine daily events corresponding to the user. The daily events can include meetings, activities, weather conditions, and the like. One of the plurality of digital images associated with one of a plurality of outfits is selected at block 408.

At block 410, the one of the plurality of digital images is displayed on a display associated with the device. The display can include a television screen, a computer monitor, a personal digital assistant screen, a cellular telephone screen, and the like. A selection of the one of the plurality of digital images is received at block 412. At block 414, an enlarged image of the selected one of the plurality of digital images is displayed. A frequency counter associated with the one of the plurality of outfits is displayed at block 416. The frequency counter can include the number of times that the outfit has been worn, the last date the outfit was worn, and the like. At block 418, a compiled outfit created by the user is stored in the plurality of outfits. Information associated with the compiled outfit is received at block 420. The information can indicate that the outfit is for warm, hot, cool, or cold weather, and/or that the outfit is business attire, casual attire, or exercise attire. At block 422, the information is stored along with the compiled outfit.

Figure 5:
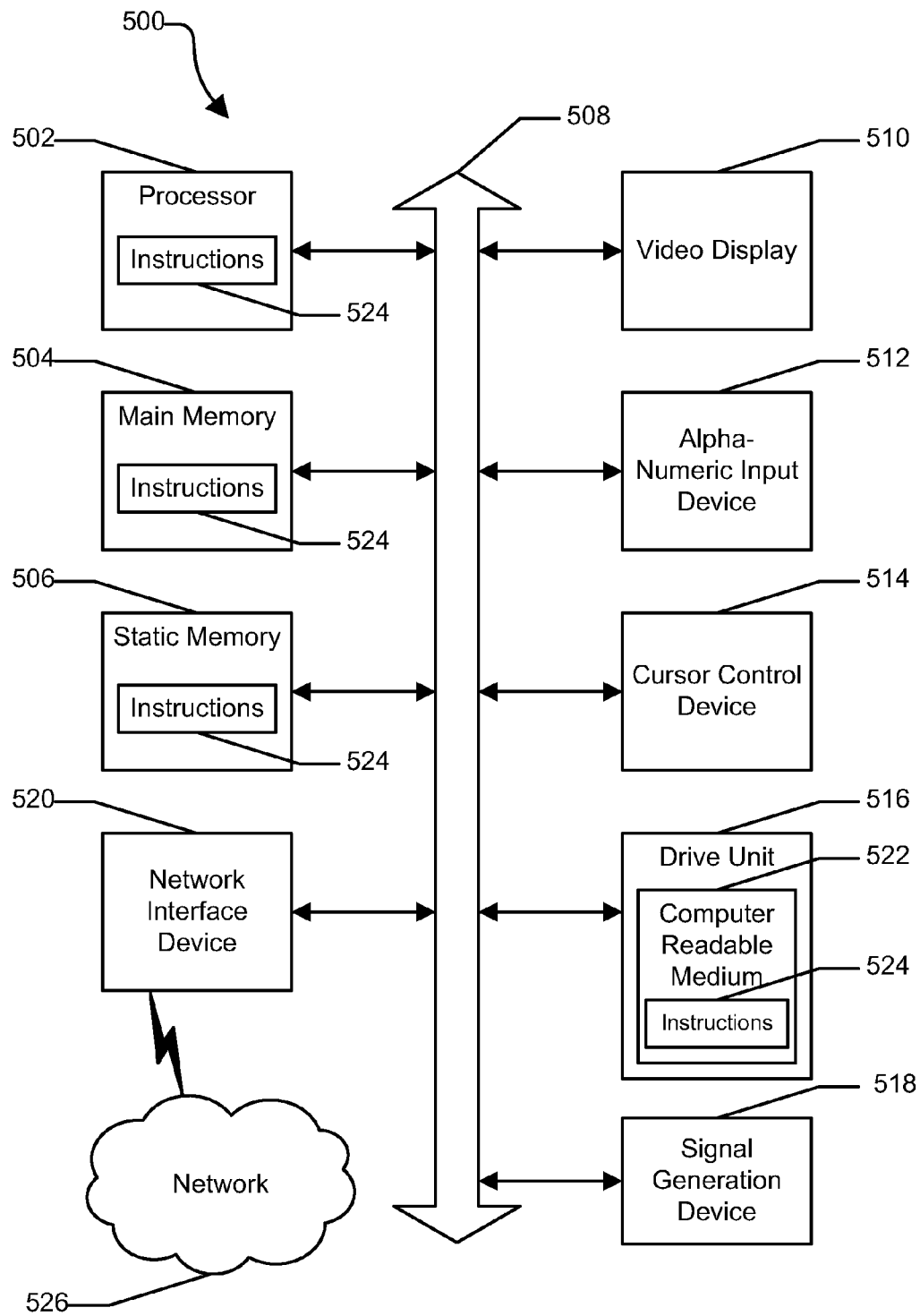
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid state display, or a cathode ray tube (CRT). Additionally, the computer system 500 may include an input device 512 such as a keyboard, and a cursor control device 514 such as a mouse. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device comprising:
   a communication module configured to communicate with a personal database and to receive a plurality of digital images associated with at least one of a respective piece of clothing and an outfit from the personal database;
   at least one camera for selectively recording the respective piece of clothing or the outfit for selectively placing the piece of clothing or the outfit in the personal database; and
   a display coupled to the at least one camera and together forming a virtual mirror, wherein the display is coupled to the communication module, the display configured to selectively present a respective piece of clothing or a outfit currently viewed by the at least one camera, configured to selectively display a first digital image associated with a recommended outfit based on a plurality of upcoming daily events associated with a user of the device, configured to display a second digital image associated with an advertised piece of clothing, and configured to enlarge the first digital image associated with the recommended outfit if the first digital image is selected, or configured to enlarge the second digital image associated with the advertised piece of clothing if the second digital image is selected.

2. The device of claim 1 wherein the communication module is further configured to communicate with a server to receive a daily weather forecast to the device as one of the plurality of the daily events.

3. The device of claim 1 the communication module is further configured to communicate with a server to receive a daily schedule for the user to the device as one of the daily events.

4. The device of claim 1 wherein the communication module is further configured to communicate with a server to receive the second digital image.

5. The device of claim 1 wherein the daily events include meeting, activities, weather conditions, or any combination thereof.

6. The device of claim 1 wherein the display is selected from a group consisting of a television screen, a computer monitor, a personal digital assistant screen, and a cellular telephone screen and wherein the virtual mirror comprises a radio frequency identification (RFID) detector for detecting an RFID tag associated with a piece of clothing.

7. A method of running a clothing recommendation module in a device, the method comprising:
   receiving a request from a user device for a recommendation for clothing;
   accessing a personal database containing a plurality of digital images including digital images previously catalogued and stored using a camera coupled to the user device;
   accessing a server to determine upcoming daily events that have been scheduled for the user;
   selecting one of the plurality of digital images associated with one of a plurality of outfits, wherein the one outfit corresponds to the daily events; and
   displaying the one digital image associated with the one outfit on a display associated with the device, wherein the display and the camera serves as a virtual mirror.

8. The method of claim 7 further comprising:
   receiving a selection of the one digital image; and
   enlarging the selected one digital image.

9. The method of claim 7 further comprising:
   storing a compiled outfit created by the user in the plurality of outfits;
   receiving information associated with the compiled outfit; and
   storing the information along with the compiled outfit.

10. The method of claim 9 wherein the information indicates that the compiled outfit associated with the information is for warm weather, for cool weather, for hot weather, for cold weather, for business events, for casual events, or any combination thereof.

11. The method of claim 7 wherein the digital images includes two or more of shirts, shoes, pants, shorts, dresses, accessories, outfits, or any combination thereof.

12. The method of claim 7 wherein the daily events include meeting, activities, weather conditions, or any combination thereof.

13. The method of claim 7 wherein the display is selected from a group consisting of a television screen, a computer monitor, a personal digital assistant screen, and a cellular telephone screen.

14. A computer readable medium comprising a plurality of instructions to manipulate a processor, the plurality of instructions comprising:
   instructions to receive a request from a user device for a recommendation for clothing;
   instructions to access a personal database containing a plurality of digital images;
   instructions to selectively record using a camera coupled to the user device a digital image of clothing for storage in the personal database, wherein the digital image of clothing recorded forms a part of the plurality of digital images;
   instructions to access a server to determine upcoming daily events that have been scheduled for the user;
   instructions to select one of the plurality of digital images associated with one of a plurality of outfits, wherein the one of the plurality of outfits corresponds to the daily events;
   instructions to display the first outfit on a display associated with the device;
   instructions to receive a selection of the one of the plurality of digital images;
   instructions to enlarge the selected one of the plurality of digital images; and
   instructions to display a frequency counter for the selected one of the plurality of outfits, wherein the frequency counter includes a number of times that the selected one of the plurality of outfits has been worn and a last date that the selected one of the plurality of outfits was worn.

15. The computer readable medium of claim 14 further comprising:
   instructions to store a compiled outfit created by the user in the plurality of outfits;
   instructions to receive information associated with the compiled outfit; and
   instructions to store the information along with the compiled outfit.

16. The computer readable medium of claim 15 wherein the information indicates that the compiled outfit associated with the information is for warm weather, for cool weather, for hot weather, for cold weather, for business events, for casual events, or any combination thereof.

17. The computer readable medium of claim 14 wherein the digital images includes shirts, shoes, pants, shorts, dresses, accessories, outfits, or any combination thereof.

18. The computer readable medium of claim 7 wherein the daily events include meeting, activities, weather conditions, or any combination thereof.

19. The computer readable medium of claim 14 wherein the display is selected from a group consisting of a television screen, a computer monitor, a personal digital assistant screen, and a cellular telephone screen.

20. The computer readable medium of claim 14, wherein the first outfit is displayed on a virtual body of the user.

* * * * *